US009729729B2

(12) United States Patent
Cohn et al.

(10) Patent No.: US 9,729,729 B2
(45) Date of Patent: *Aug. 8, 2017

(54) IN-STORE READING SYSTEM

(71) Applicant: NOOK DIGITAL, LLC, New York, NY (US)

(72) Inventors: Ted Cohn, New York, NY (US); Michael Reilly, New York, NY (US); Victoria Repice, New York, NY (US); Theresa Horner, New York, NY (US); Terri Pucin, New York, NY (US); Stanislav Tsvetanov, New York, NY (US); James Kung, New York, NY (US); David Mandelbaum, New York, NY (US)

(73) Assignee: NOOK DIGITAL, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,771

(22) Filed: Feb. 1, 2016

(65) Prior Publication Data

US 2016/0150095 A1 May 26, 2016

Related U.S. Application Data

(63) Continuation of application No. 12/907,951, filed on Oct. 19, 2010, now Pat. No. 9,253,640.

(Continued)

(51) Int. Cl.
*H04M 15/00* (2006.01)
*H04W 12/08* (2009.01)
*H04L 29/06* (2006.01)

(52) U.S. Cl.
CPC .......... *H04M 15/88* (2013.01); *H04M 15/59* (2013.01); *H04M 15/60* (2013.01); *H04W 12/08* (2013.01);

(Continued)

(58) Field of Classification Search
CPC .... G06F 21/10; H04N 21/81; H04N 21/2541; G06Q 30/02

(Continued)

(56) References Cited

U.S. PATENT DOCUMENTS 7,536,725 B2   5/2009   Raciborski
7,653,574 B2   1/2010   Harper et al.

(Continued)

OTHER PUBLICATIONS

Rui, Y., A. Gupta, J. Grudin, L. He, Automating lecture capture and broadcast Technology and videography, Multimedia Syst., Jun. 2004, pp. 3-15, vol. 10, No. 1.

(Continued)

*Primary Examiner* — Jamal Javaid
(74) *Attorney, Agent, or Firm* — The Law Office of Michael J. Scheer

(57) ABSTRACT

A system and method for providing digital data content to a wireless device. Although a fee is typically charged for access to the digital data content, e.g., electronic books, the system and the method provides controlled access to this content for free while the wireless device is accessing the content in a specified location, e.g., a retail location. A content control server receives a request from the wireless device requesting access to the digital data content. The request is received over a secure connection, preferably a virtual private network (VPN). The content control server monitors how much of the digital data content has been provided to the wireless device, and/or an amount of time the wireless device has been accessing the digital data content. This content control server uses this monitored data to control, throttle, the provision of the digital data content to the wireless device.

20 Claims, 5 Drawing Sheets

Related U.S. Application Data

(60) Provisional application No. 61/253,049, filed on Oct. 19, 2009.

(52) U.S. Cl.
CPC ............... *G06F 2221/0775* (2013.01); *G06F 2221/2111* (2013.01); *G06F 2221/2135* (2013.01); *G06F 2221/2151* (2013.01); *H04L 63/0272* (2013.01)

(58) Field of Classification Search
USPC ...... 370/338, 252, 255, 238; 725/29, 81, 25, 725/46; 709/226
See application file for complete search history.

(56) References Cited

U.S. PATENT DOCUMENTS

| | | | |
|---|---|---|---|
| 8,032,575 | B2 | 10/2011 | Oyama |
| 8,088,010 | B1 | 1/2012 | Hill |
| 2002/0066109 | A1 | 5/2002 | Tam et al. |
| 2004/0039750 | A1 | 2/2004 | Anderson et al. |
| 2004/0107368 | A1* | 6/2004 | Colvin ............... G06F 21/121 726/30 |
| 2004/0249768 | A1 | 12/2004 | Kontio et al. |
| 2005/0165726 | A1 | 7/2005 | Kawell, Jr. et al. |
| 2007/0256092 | A1 | 11/2007 | Chung et al. |
| 2008/0062940 | A1 | 3/2008 | Othmer et al. |
| 2008/0107031 | A1 | 5/2008 | Cnudde et al. |
| 2008/0174550 | A1 | 7/2008 | Laurila et al. |
| 2008/0215974 | A1 | 9/2008 | Harrison et al. |
| 2009/0051648 | A1 | 2/2009 | Shamaie et al. |
| 2009/0055408 | A1 | 2/2009 | Warren et al. |
| 2009/0100068 | A1 | 4/2009 | Gauba et al. |
| 2009/0106393 | A1 | 4/2009 | Parr et al. |
| 2009/0165083 | A1* | 6/2009 | Mclean ............... G06F 21/10 726/1 |
| 2009/0310663 | A1 | 12/2009 | Menon et al. |
| 2011/0153833 | A1 | 6/2011 | Kothari et al. |

OTHER PUBLICATIONS

Ndje, T., U.S. Office Action, U.S. Appl. No. 12/907,244, Nov. 9, 2012, pp. 1-31.

* cited by examiner

IN-STORE READING SYSTEM

CROSS-REFERENCE TO RELATED APPLICATIONS

This application is a continuation of U.S. application Ser. No. 12/907,951, filed Oct. 19, 2010, which claims benefit of U.S. Provisional Application No. 61/253,049 filed Oct. 19, 2009. The content of each prior application is expressly incorporated herein by reference thereto.

FIELD OF INVENTION

This invention relates to digital content distribution and, in particular, to a consumer system for downloading and using digital content within the confines of an authorized location.

BACKGROUND OF THE INVENTION

Systems that provide digital content in a wireless environment are known. For example, U.S. Pat. No. 7,653,574 to Harper et al. describes a method for in store purchase of digital content in which a number of kiosks ("LVS") are set up around the store. The customer logs onto a kiosk and browses digital content. The customer can then purchase the digital content and download it to a mobile device or burn it to a CD.

U.S. Published Pat. Application No. 2008/0062940 discloses a method of pushing content to a mobile device when it is detected that the mobile device is within a proximity of a location covered by a wireless local area network (WLAN).

U.S. Published Pat. Application No. 2009/0055408 generally describes a method for sharing digital content from a localized server. The content is shared between a wireless storage device and a sharing device, over a wireless interface.

While these systems describe various methods of sharing digital content over a network, they do not provide a method for limiting the amount of free digital content that can be downloaded or streamed to a customer's portable device at a retail store or other location, so as to limit delivery of the content to the portable device to the case when the device is in the immediate vicinity of the retail store or other location, and in accordance with the amount and time duration of the customer's accessing of the digital content.

BRIEF SUMMARY OF THE INVENTION

In accordance with a first aspect of the present invention, the system provides digital data content to a wireless device. The system includes a digital data content control server that receives, over a secure connection, a request from the wireless device requesting one or more portions of the digital data content. The content control server, in response to the request, provides the wireless device with limited access to the digital data content. The content control server includes a data store that stores the digital data content, a web server that maintains the secure connection between the wireless device and the control server, and digital data content provision software. The digital data content provision software monitors how much digital data content has been provided to the wireless device, and/or an amount of time the wireless device has been accessing the digital data content. The digital data content provision software throttles the provision of the digital data content on the basis of throttling criteria including the monitored amount of provided digital data content and/or the monitored amount of time.

In accordance with a second aspect of the present invention, the method of the present invention provides digital data content to a wireless device. A content server receives, via a secure connection, a request from the wireless device for one or more portions of the digital data content. The server provides, on a portion by portion basis, the requested digital data content to the wireless device. The server further monitors how many portions of the digital data content have been provided to the wireless device, and/or an amount of time the wireless device has been accessing the digital data content. On the basis of throttling criteria including the monitored number of portions and/or the amount of time, the server throttles the provision of the digital data content.

A third aspect of the present invention includes a system for providing digital data content. The system incorporates a wireless device, a digital data content control server storing the digital data content, a wireless access point and throttling software. The wireless access point provides a secure connection between the wireless device and the digital data content control server. The throttling software controls the provision of the digital data content from the control server to the wireless device on the basis of throttling criteria. The throttling criteria includes the amount of digital data content provided and/or an amount of time that the wireless device has accessed the digital data content on the digital data content control server.

In each aspect of the invention, the digital data content is provided to the customer without charge, although without the systems and method of the present invention, the digital data content is normally provided for a fee. The content server further includes a throttling database that stores throttling records specific to particular customers. The secure connection between the wireless device and the content server is preferably a virtual private network (VPN) connection. Preferably, the digital data content is an electronic book, but can also be other digital data content such as music or videos. In a preferred aspect the wireless device connects to the digital data content control server through the wireless access point that is provided in a retail location.

BRIEF DESCRIPTION OF DRAWINGS

For the purposes of illustrating the present invention, there is shown in the drawings a form which is presently preferred, it being understood, however, that the invention is not limited to the precise form shown by the drawing in which.

DETAILED DESCRIPTION

The present invention, in its preferred embodiments, relates generally to an in-store reading system for delivering digital content to a customer's WiFi-enabled electronic device solely in the immediate vicinity of an authorized store. In accordance with preferred embodiments, a customer may access free, in-store digital content over an authorized store's Wi-Fi network, but only when the customer is physically in or near the authorized store within range of the store's WiFi network. Preferably, for the customer to access the free digital content, the customer's electronic device must be associated with a customer's account with the store, and recognized by the in-store reading system.

As will be discussed in more detail below, in accordance with a preferred embodiment, the digital content that would otherwise have to be purchased may be delivered to the customer's electronic device and freely used only for a limited time. Preferably, the free digital content is delivered a "page" or "portion" at a time as the customer reads. Once the limit for using the digital content expires, or the customer leaves the authorized store (leaves the range of the WiFi network), the in-store digital content is no longer accessible to the customer.

Figure 1A:
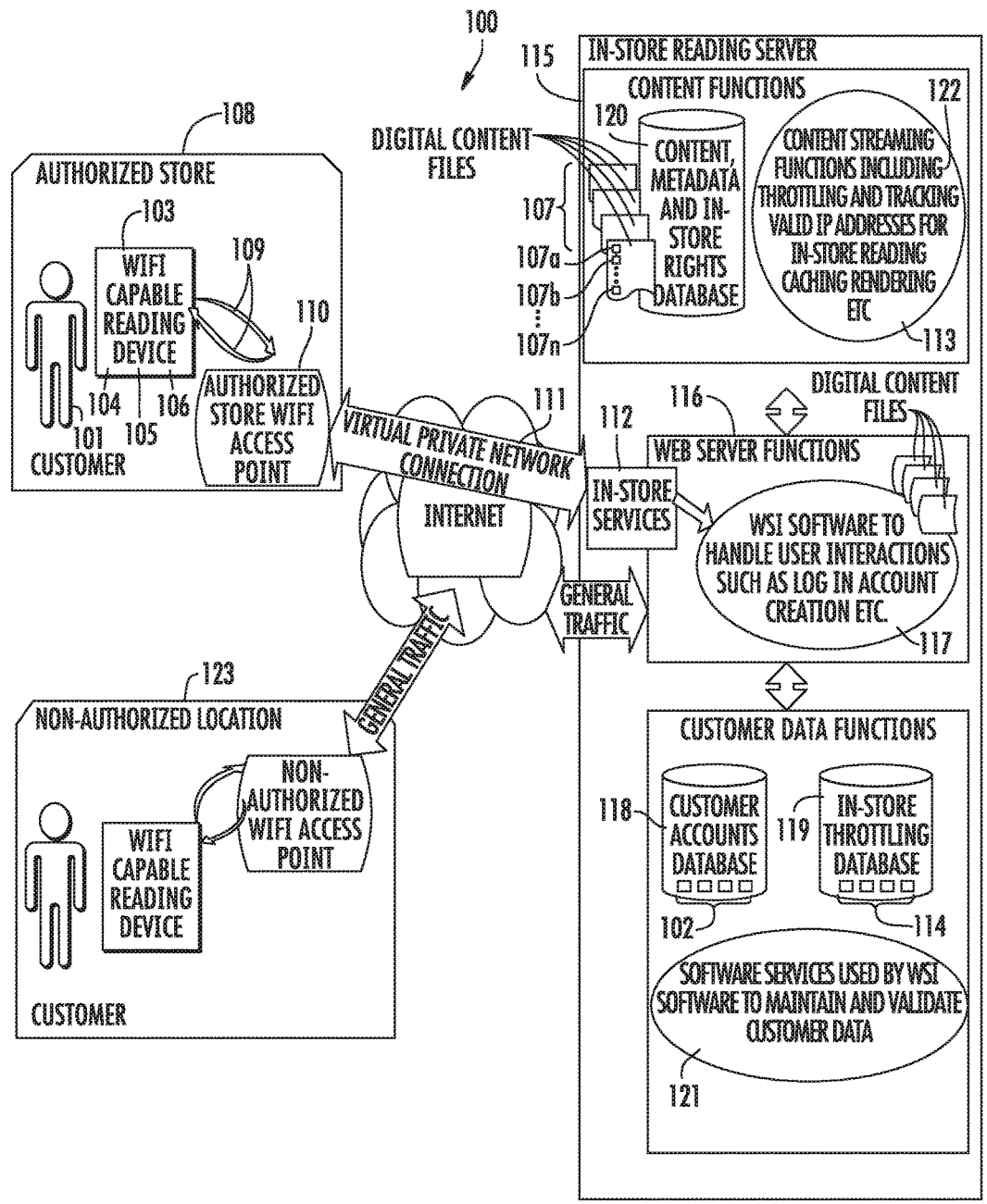
FIG. 1A is a block diagram of an in-store reading system in accordance with an embodiment of the present invention.

An exemplary in-store reading system 100 in accordance with an illustrative embodiment of the invention is shown in FIG. 1A. FIG. 1A illustrates an example of a wireless network in which the invention can be practiced. However, the illustrated arrangement is for purposes of example only and other arrangements and elements may be employed based on the teachings in the present application. Further, as would be appreciated by those skilled in the art, some of the elements shown in FIG. 1A are functional entities that may be implemented by various combinations of software, firmware and/or hardware.

A customer 101 is an authorized user of the in-store reading system 100 and has an account 102, which authorizes the customer 101 to use the in-store reading system 100. The customer 101 can access the in-store reading system 100 using a WiFi capable device 103, which the customer 101 has previously associated with the account 102, using account credentials of the customer 101.

Figure 1B:
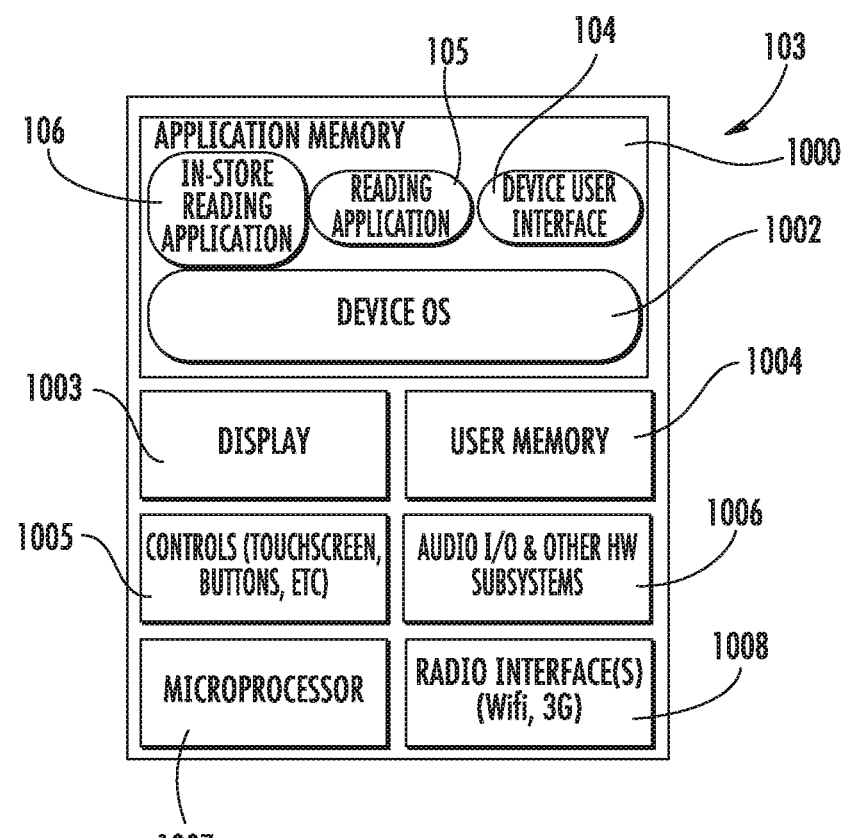
FIG. 1B is a functional block diagram of an exemplary device that can be used by a consumer to read in-store digital content.

As is shown in FIG. 1B, the device 103 preferably includes thereon a device user interface 104 and device content reading application 105, which preferably comprise software applications stored in application memory 1000 that have been previously downloaded and/or installed and are running on a microprocessor 1007 in the device 103. A device operating system (OS) is running on the microprocessor 1007 to control the various functions and interfaces of the device 103.

The device 103 is equipped with wireless interface circuitry 1007 allowing it to access and communicate wirelessly with wireless networks, including wireless local area networks (Weans).

The device user interface 104 enables the customer 101 to interact with the device 103, including logging into account 102 and engaging with the device content reading application 105, for example by generating graphical user interfaces on a display 1003 of the device 103. In addition, the device 103 preferably includes input mechanisms/controls 1005, such as touchscreen or other buttons, that permit the customer to provide inputs to the device 103 e.g., for the entry of control commands. The customer 101 engages with device content reading application 105, e.g., by entry of commands into the device and reading the display 1003, in order to use digital content when participating in the in-store reading system 100. Such a device will typically include user memory 1004, audio I/O and other hardware subsystems 1006, and a microprocessor 1007 to control the device and run the various applications.

The device content reading application 105 also includes a device in-store reading interface 106, also software that has been previously downloaded and/or installed on the device 103 that allows the customer 101 to discover, request, and receive digital content 107 when the customer 101 is in an authorized store 108. The device 103 can be, for example, an eBook reader, a cell phone, an MP3 player, a laptop computer, a Personal Digital Assistant, or other such electronic device that is capable of communicating wirelessly.

The digital content 107 that can be accessed by the customer 101 in accordance with the preferred embodiment preferably has in-store reading rights associated with it. In a preferred embodiment, the in-store reading system 100 is configured to provide the digital content 107 free, i.e., at no cost to the customer 101, but only when the device 103 is in the vicinity of an authorized store 108, and as long as time and/or data constraints, described further below, are being met. It should be noted that while digital content 107 is illustrated in FIG. 1 as part of the in-store reading server, it need not be limited to being in that location. As would be appreciated by those skilled in the art, the digital content could be stored remotely and accessed by the in-store reading server on an as needed basis, or on any other appropriate basis. Further, the digital content 107 that is provided free through the system and method of the present invention is typically also available for purchase.

The authorized store 108 is a physical location, for example a retail establishment, having an in-store WiFi network 109 and an authorized WiFi Access Point (WAP) 110. In accordance with a preferred embodiment, the customer 101 is only allowed to request and receive digital content 107 on the device 103 while he or she is physically located in the vicinity of the authorized store 108, and while connected to WAP 110. However, while the illustrated embodiment discusses the situation involving a retail establishment, the present invention is not limited to this situation. For example, the system can operate in a library, for example, supplying, in a limited manner, data content that might otherwise have to be purchased.

To begin operation, the customer 101 turns on the device 103 in the authorized store 108, or enters with a device 103 that is already turned on, at which point the device 103 may detect in-store WiFi network 109. The device can then access the network 109 through the authorized WAP 110, for example by detecting a MAC address being broadcast by the WAP 110, in a manner known to those skilled in the art, or in any other known manner. Once the device 103 is active on the in-store WiFi network 109 and the customer 101 interacts with the device in-store reading interface 106 in the device 103, transmissions to and from the device 103 occur over a Virtual Private Network (VPN) 111 connection. Preferably, the connection to the VPN network is created and managed with specialized hardware and software that is hosted by the WAP 110. Such software is known to those skilled in the art and available, for example from companies such as Cisco systems.

The VPN 111 secures and separates in-store reading traffic between device 103 and other electronic components of in-store reading system 100 from general traffic originating inside and outside authorized store 108, for example, from traffic on the Internet.

As shown in FIG. 1A, the in-store reading system includes an in-store reading server 115 that manages the delivery of digital content 107. The in-store reading server includes hardware and software to perform additional in-store reading functions of the in-store reading system 100. The in-store reading server 115 handles front-end functions related to web server operations and user interactions with in-store reading interfaces. The in-store reading server 115 also handles all backend functions of in-store reading system 100, e.g., related to managing accounts, tracking in-store content throttling, maintaining content metadata and in-store reading rights, and providing content streaming services. The server 115, typically remote from stores, preferably services a plurality of stores simultaneously.

The device in-store reading interface 106 presents, e.g., graphical user interfaces to facilitate the perusal, selection and request of digital content 107 by the customer 101. In a preferred embodiment, the device 103 transmits a request for digital content 107 over the VPN 111 to in-store web services 112, which is preferably software or other control operating on or in relation to the store's computer system that handles the request for digital content 107 and the streaming of digital content 107 back to the device 103.

For streaming back to the device 103, digital content 107 is preferably decomposed into digital content portions 107a, 107b, 107c, . . . 107n. For example, digital content portion 107a is an initial data portion, such as a page of a book, of digital content 107 that is to be streamed to device 103. As represented in FIG. 1, digital content portion 107b is the next data portion of digital content 107 that is streamed, after 107a, and so on.

The local wireless network used in a preferred embodiment may be, for example, an IEEE 802.11 wireless local area network (WLAN) or an IEEE 802.15 wireless personal network (WPAN). The local wireless connection is not limited to these examples and can include any network to which a wireless device 103 could connect with while in proximity of a wireless access point of the network. Other types of networks could also be used, such as a Bluetooth connection.

In accordance with a preferred embodiment, the streamed delivery of digital content portions 107a, . . . 107n to device 103 is "throttled," i.e., controlled, metered, and/or timed, based on an in-store reading throttling algorithm 113, to be discussed further below in relation to the flow chart of FIG. 3. The in-store reading throttling algorithm 113 gauges the time spent, and the speed by which, the customer 101 consumes each digital content portion of digital content 107 and adjusts the streaming of content 107 accordingly. A customer content throttling record 114, associated with the customer 101 and digital content 107, is maintained in a database in the in-store reading system 100.

The in-store reading server 115 employs a web server 116 and Web Service Interface (WSI) software 117 to handle interactions between front-end components, such as device in-store reading interface 106 and in-store web services 112, and back-end database components of the in-store reading system 100. The web server 116 services include serving up in-store software services 112 to client users, such as the wireless devices 103, operating in the store. Among other things, the web server 116 supplies HTML web pages to client users. WSI software 117 services include handling log in to the account 102 and processing content throttling records. Preferably, the WSI software is configured to industry standards and hosted over standard HTTP protocols for compatibility with all devices.

Back-end database components of the in-store reading system 100 preferably include a customer accounts database 118, an in-store throttling database 114, and a content, metadata and store rights database 120. Records for each account 102, discussed above, are stored and managed in the customer accounts database 118. Records for the customer content throttling record 114, a record of a customer usage of the free digital content 107 over a particular period of time, are stored and managed in the in-store throttling database 119.

With regard to the digital content, a content, metadata in-store rights database 120 is provided in the in-store reading server. The content, metadata database serves as a source of metadata and in-store reading rights information for individual digital content items in the in-store reading system 100. The in-store reading rights information in the content, metadata database 120 indicates that digital content 107 may be used for in-store reading. Such rights information would, for example, indicate whether and for how long each particular content item may be read. Other metadata includes, for example, standard information about the books being read, i.e., title, author, publisher, and the like.

As backend components of the in-store reading server 115, the WSI software 117 interfaces with customer data services software 121 to access customer accounts database 118 and in-store throttling database 119. Customer data services 121 is software or other control that processes database lookups, such as a lookup to verify customer data in the account 102 for the customer 101 logins. Customer data services 121 preferably also processes database updates, such as creating and updating the customer content throttling record 114.

The WSI software 117 interfaces with in-store content streaming services 122 software to manage content streaming functions. Such functions include throttling and tracking valid accounts and IP addresses for in-store reading, and caching and rendering digital content portions 107a, . . . 107n, for example by tracking the IP address of the device 103 to verify and prevent a customer from attempting to read multiple books simultaneously from the same device. The tracking of valid accounts ensures that a user has registered with the content provider and has, for example, provided a valid credit card number on their account. The software preferably checks that multiple accounts do not use the same credit card, which prevents a particular user from reading multiple books simultaneously on multiple devices.

The non-authorized location 123 shown in FIG. 1A is presented for illustration purposes only, i.e., to show general traffic that might occur in or near a physical authorized store 108. Any requests coming into the in-store reading system 100 over the general Internet would be denied access to the in-store services. The system 100 preferably only accepts and provides the digital content for in-store reading to requests that come in over the VPN 111. The non-authorized location 123 is not a component of the in-store reading system 100, and forms no part of the invention.

In the preferred embodiment, the in-store reading system 100 is an in-store electronic book (eBook) reading system, however, the invention is not limited to an in-store eBook reading system. As would be appreciated, the in-store reading system 100 may be used for the in-store consumption of other digital content, such as digital movies, digital music, digital audio books, digital pictures, or other streamable digital content.

In the illustrated preferred embodiment, the device 103 is a mobile, WiFi-capable electronic reader (eReader) device. However, the device 103 in accordance with the present invention is not limited to an eReader device. The device 103 may be any other type of mobile consumer electronic device, such as a multi-purpose cell phone.

Figure 2A:
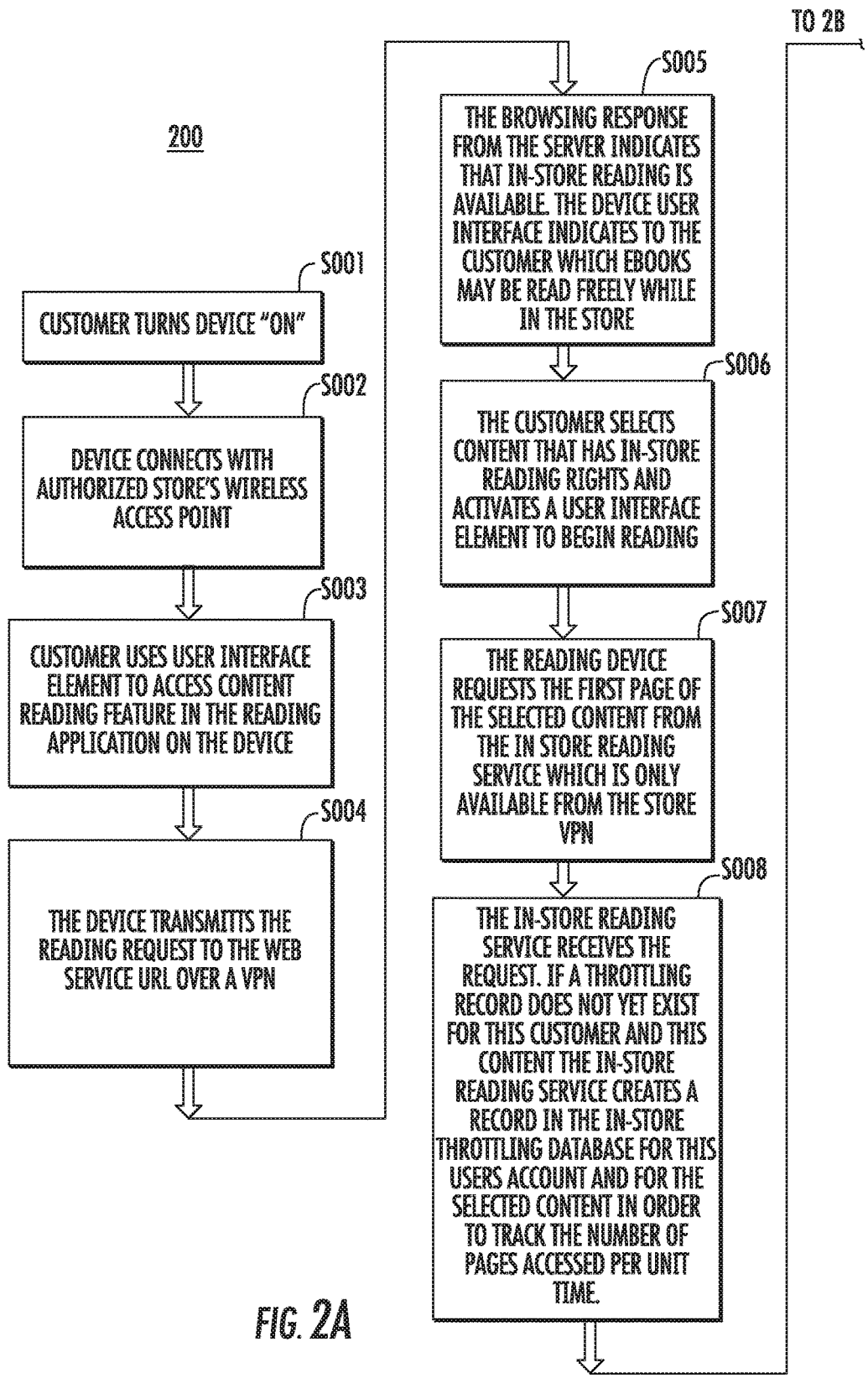
FIGS. 2A and 2B together comprise a flow diagram illustrating an exemplary embodiment of a method for an in-store reading system in which a customer uses a device to obtain free in-store digital content to read.
Figure 2B:
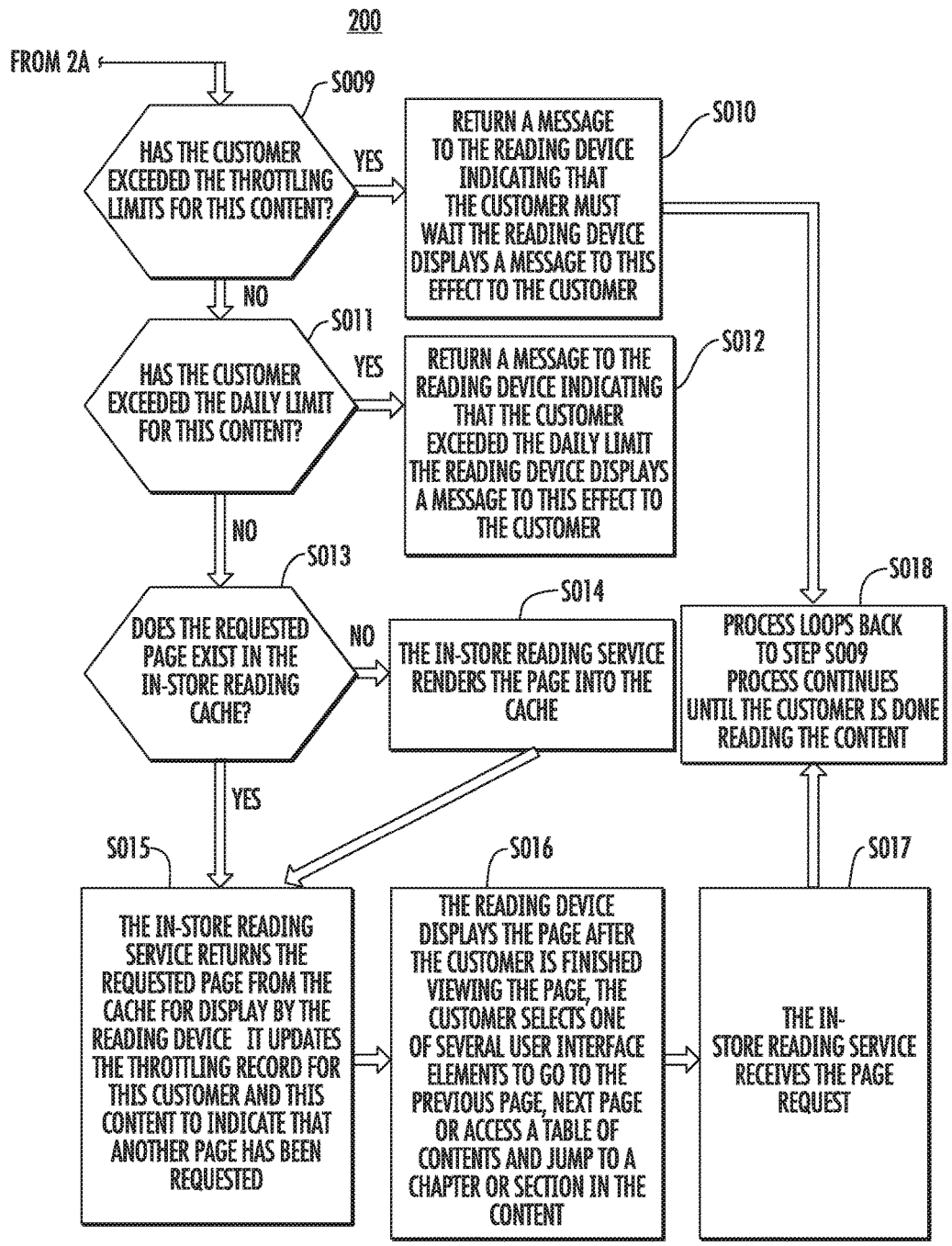

FIGS. 2A and 2B illustrate an exemplary method 200 for requesting free in-store reading content, in which a customer 101 accesses and reads digital content 107 using device 103 using the in-store reading system 100.

Initially, as a precondition for the customer 101 utilizing the system, he or she must be physically in or near an authorized store location 108 and have a WiFi capable device 103. At step S001, the customer 101 turns on device 103. At step S002, the device 103 connects with the authorized store's wireless access point (WAP) 110. The device 103 detects that in-store WiFi network 109 is in range and connects to it through authorized WAP 110. For some general purpose devices, it may be necessary for the customer 101 to make sure that the device 103 is connected to the store's WiFi network rather than any other available network in range of the device.

At step S003, the customer uses the user interface element to access content in a reading application on the device. The user must be logged onto a valid account to access content. The device 103 may already be running device content reading application 105. Otherwise, the customer 101 may use device user interface 104 to invoke device content reading application 105. If the customer 101 is not automatically logged into account 102, customer 101 uses device user interface 104 to log in.

Customer 101 or device content reading application 105 invokes device in-store reading interface 106 to discover the availability of in-store reading system 100 and digital content 107 in authorized store 108. The device 103 transmits, at step S004, a request for digital content 107 over VPN 111 to the URL address of in-store web services 112. This request goes over the VPN 111 to the in-store web services 112, which passes in the request for digital content 107 to in-store reading server 115.

At step S005, the in-store reading server 115 responds back to in-store web services 112 that digital content 107 is available. A response that the digital content 107 is available is then sent by in-store web services 112 over VPN 111 to the device 103. The device in-store reading interface 106 indicates to the customer 101, for example by presentation of a particular GUI or by other means, that digital content 107 is available, and preferably which content may be freely accessed while in the store.

At step S006, the customer 101 uses the device in-store reading interface 106 to select digital content 107. The customer 101 uses an appropriate control on the device user interface 104, in conjunction with, e.g., data entry controls, such as buttons, on the device 103 to begin reading digital content 107, using device content reading application 105.

At step S007, to initiate free in-store reading of digital content 107, the device 103 sends a reading request to get, e.g., the first page of digital content 107. As the device is connected to the authorized store's WAP 110, the request is sent over VPN 111 to the URL address of in-store web services 112.

The in-store web services 112 interfaces with WSI software 117 to access customer content throttling record 114 and to initiate an in-store streaming throttling algorithm 113, for example, software running on the server 115. The throttling algorithm 113 is described in more detail below with reference to the flow chart of FIG. 3.

If a customer content throttling record 114 does not yet exist for customer 101 and the digital content 107, then at step S008 customer data services 121, software that is used by the WSI software 117 to maintain and validate customer data, are invoked to create a customer content throttling record 114 in the in-store throttling database 119 to track, e.g., the number of pages accessed per unit time, or other appropriate measure.

The in-store web services 112 interfaces with the WSI software 117 to invoke in-store content streaming services 122. The in-store content streaming services 122 is software running on the server that creates and caches, if necessary, and then streams digital content portions 107a, . . . 107n to the device 103 based on how the customer 101 consumes digital content 107. The streaming of digital content portions 107a, . . . 107n, to the device 103 is throttled faster or slower, as determined by in-store streaming throttling algorithm 113.

If customer 101 requests a digital content portion and the throttling algorithm 113 determines at step S009 that the request came in too quickly based on the current throttling limits, then in-store web services 112, at step S010, returns a message to the device 103 indicating that the customer 101 must wait before gaining access to the requested content portion and the process proceeds to step S018.

Another factor evaluated by in-store content streaming services 122 is the time limit that customer 101 is allowed to consume digital content 107 in an already established time period. For example, customer 101 may be limited to consuming digital content 107 to two cumulative hours within a business day. If a request for a digital content portion is determined to have exceeded the time limit that customer 101 is allowed to consume digital content 107, or some other predetermined daily limit for this content, then in-store web services 112, at step S012, returns a message to device 103 indicating that customer 101 must wait before gaining access to digital content 107 again. Device 103 presents a user message to that effect to the customer 101, through the device in-store reading interface 106.

In addition, if the customer 101 exceeds an already established maximum time period for consuming an individual digital content portion, then a timer for the time limit of digital content 107 stops. This allows the customer 101 to pause from active usage of digital content 107 without negatively affecting the customer 101's time limit for using digital content 107. For example, this allows customer 101 to pause, engage in a conversation, and then resume consuming the digital content 107. Because the timer stops during customer 101's pause in consuming the digital content 107, the time expended beyond the established maximum time period during the pause is not counted towards the time limit of digital content 107.

If it is determined at step S011 that the customer 101 has not exceeded the time limit for consuming digital content 107, then in-store web services 112, at step S013 determines the availability of digital content portion 107a, e.g., page, rendered in an in-store reading cache on in-store reading server 115. If it is determined at step S013 that a rendered digital content portion 107a does not exist in the cache, then at step S014 the in-store content streaming services 122 renders it into the cache.

On the other hand, if it is determined at step S013 that the rendered digital content portion 107a does exist in the cache, then at step S015 the in-store web services 112 returns the requested digital content portion 107a to the device 103 for display. WSI software 117 invokes customer data services 121 to update customer content throttling record 114 in in-store throttling database 119 to indicate that another portion, e.g., another page, has been requested.

After the customer 101 finishes consuming digital content portion 107a, at step S016 the customer 101 selects a control, e.g., on the device user interface 104, or on a control on the device 103 itself, such as a button, to invoke the next desired action in the device content reading application 105. For example, the customer 101 may select a navigation control to go to a previous page, next page, access a table of contents, or jump to a chapter or section of digital content 107. Once the customer 101 makes the desired selection, at step S017 the device 103 transmits this next request over VPN 111 to in-store web services 112, which receives the page (i.e., portion) request.

At step S018, processing returns to step S009 for processing the subsequent portions, e.g., pages, of content. Processing proceeds as before from step S009 and, upon success, in-store web services 112 returns the requested digital content portion 107b to device 103 for display.

Processing continues as before for digital content portion 107c and so on until the customer 101 finishes the permitted in-store free content, or exceeds the time limit for digital content 107. As discussed previously, if the customer 101 exceeds the time limit for digital content 107, a message is returned to the device 103 at step S010 and a user message is displayed in the device's in-store reading interface 106, indicating that customer 101 must wait before gaining access to digital content 107 again.

Figure 3:
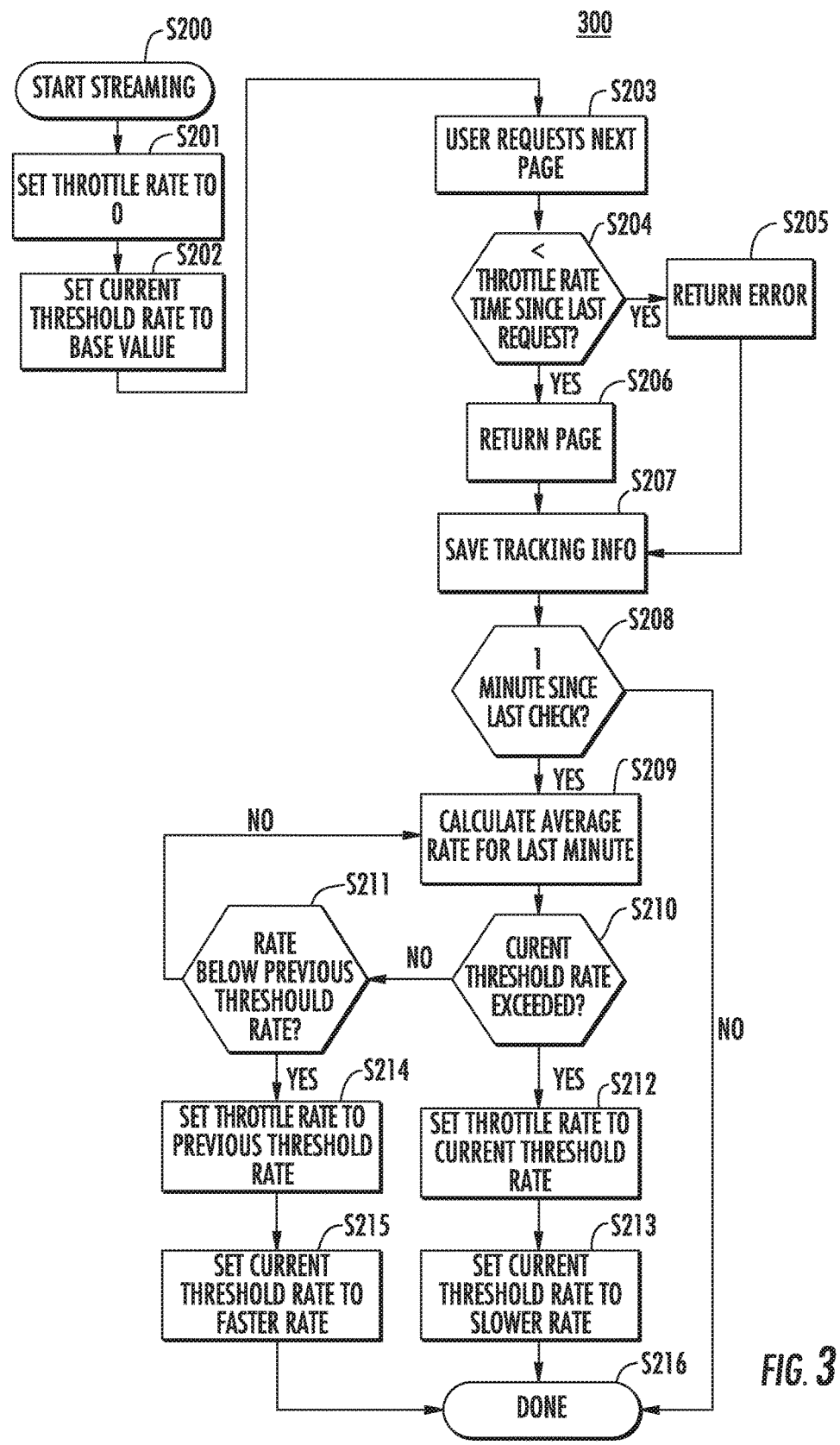
FIG. 3 is a flow diagram illustrating an exemplary embodiment of a method for throttling the digital content that is being streamed to a customer in an in-store reading system.

FIG. 3 shows a flow chart representative of an exemplary embodiment of a method 300 of performing the in-store streaming throttling algorithm 113. At step S200, streaming starts for digital content 107, and, at step S201, the throttle rate is set to zero and, at step S202, the current threshold rate is set to a base value. The throttle rate may be, for example, one digital content portion (e.g., page) per 10 seconds. The current threshold rate may be, for example, two digital content portions per 10 seconds. Any recalculation of the rates may be set to occur in less than one minute timeframes.

When the customer 101, using the device 103, requests the next digital content portion (e.g., page) at step S203, for example, digital content portion 107b, portion 107b is delivered and customer content throttling record 114 is updated in in-store throttling database 119. Upon the device 103 requesting digital content portion 107c, it is determined, at step S204, if the time since the previous request is less than the throttle rate time. If so, an "error" signal is returned at step S205 and the flow proceeds to step S207, at which the tracking information is saved. If not, then the requested page is returned to the customer at step S206.

The in-store streaming throttling algorithm 113 then checks, at step S208, if it has been 1 minute since the last check. If no, then the flow proceeds to step S216 and is done. If yes, the throttling algorithm calculates, at step S209, the average rate of portion requests for the last minute. If it is determined, at step S210, that the calculated rate exceeds the current threshold rate, then the throttle rate is set, at step S212, to the current threshold rate and, at step S213, the current threshold rate is set to a slower rate.

On the other hand, if the calculated rate does not exceed the current threshold rate and also determined, at step S211, that the rate is below the previous threshold rate, then the throttle rate is set, at step S214, to the previous threshold rate and, at step S215, the current threshold rate is set to a faster rate. If the result of step S211 is no, then processing loops back to step S209 where the average is calculated again. Throttling calculations stop when customer 101 becomes inactive for the maximum time set for a customer to reasonably consume a digital content portion.

In an alternative embodiment, rather than throttling the digital content, the system and method of the present invention can limit the user's access to the free digital content for some fixed total amount of time per day, e.g., two hours.

While the above description has been set forth in the context of a system and method for providing digital content to a customer's wireless eBook reader, the present invention is not limited to being used for this purpose. The system and method may be used to deliver other digital content to other types of wireless devices to deliver, for example, video, text, audio, any combinations thereof, and any other digital downloadable and/or streamable content.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system providing digital data content to a wireless device, the system comprising:
   a local server, the local server maintaining a wireless network and receiving a request from the wireless device requesting one or more portions of the digital data content;
   a digital data content control server remote from and connected to the local server; the digital data content control server comprising:
   a data store storing the digital data content;
   a customer database storing customer account information; and
   a web server connected to the data store and the customer database, the webserver receiving the request from the local server and confirming a correlation between the request and a customer in the customer database, the web server establishing and maintaining a secure connection between the wireless device and the digital data content control server; and
   digital data content provision software cooperatively operable on the local server and the digital data content control server; the digital data content provision software:
   (a) providing, on a portion by portion basis, the requested digital data content to the wireless device;
   (b) monitoring:
      (i) how many portions of the digital data content have been provided to the wireless device, and
      (ii) an amount of time the wireless device has been accessing the digital data content;
   (c) stopping the provision of the digital data content if a predetermined limit on the amount of provided digital data content is exceeded; or a predetermined limit on the amount time the wireless device has been accessing the digital data content is exceeded.

2. The system according to claim 1, wherein the digital data content is provided to the customer without charge.

3. The system according to claim 2, wherein the digital data content is otherwise provided for a fee.

4. The system according to claim 1, further comprising a timer performing the monitoring of the amount of time the wireless device has been accessing the digital data content, wherein a user of the wireless devise is capable of stopping the timer and stopping the provision of the digital data content.

5. The system according to claim 1, further comprising a cache in the local server, wherein the local server receives requested portions of digital data content from the digital data content control server and stores them in the cache.

6. The system according to claim 1, wherein the digital data content control server further comprises a throttling database that stores throttling records specific to particular customers.

7. The system according to claim 6, wherein the provision of data is done with reference to the throttling records in the throttling database.

8. The system according to claim 1, wherein the secure connection is a virtual private network (VPN) connection.

9. The system according to claim 1, wherein the digital data content is an electronic book.

10. The system according to claim 1, wherein the digital data content is audio.

11. The system according to claim 1, wherein the digital data content is a video.

12. The system according to claim 1, further comprising a wireless access point connected to the local server, wherein the wireless device connects to the digital data content control server through the wireless access point.

13. The system according to claim 12, wherein the wireless access point is provided in a retail location.

14. A method for providing digital data content to a wireless device from a data store in a digital data content control server, the method comprising:
   maintaining, by local server, a wireless network;
   receiving, by the local server over the wireless network, a request from the wireless device requesting one or more portions of the digital data content;
   establishing a secure connection between the local sever and the digital data content control server,
   transmitting the request from the local sever to the digital data content control server;
   authorizing the request as being associated with a customer account in a customer database in the digital data content control server;
   providing, by the digital data content control and the local server, on a portion by portion basis, the requested digital data content to the wireless device;
   monitoring, by the server:
      (i) how many portions of the digital data content have been provided to the wireless device, and
      (ii) an amount of time the wireless device has been accessing the digital data content; and
   stopping, by the digital data content control and the local server, the provision of the digital data content if a predetermined limit on the amount of provided digital data content is exceeded; or a predetermined limit on the amount time the wireless device has been accessing the digital data content is exceeded.

15. The method according to claim 14, wherein the digital data content is provided to the customer for free.

16. The method according to claim 14, wherein the monitoring of the amount of time the wireless device has been accessing the digital data content is performed by a time, the method further comprising stopping the timer and stopping the provision of the digital data content at the direction of a user of the wireless device.

17. The method according to claim 14, further comprising caching, by the local server, the requested portions of digital data content received from the digital data content control server.

18. The method according to claim 14, further comprising storing throttling records specific to particular customers in a throttling database.

19. A system for providing digital data content, the system comprising:
   a wireless device;
   a digital data content control server storing the digital data content;
   a wireless access point providing a secure connection between the wireless device and the digital data content control server; and
   digital data content provision software operable on the digital data content control server that:
      (a) provides, on a portion by portion basis, the requested digital data content to the wireless device;
      (b) monitors:
         (i) how many portions of the digital data content have been provided to the wireless device, and
         (ii) an amount of time the wireless device has been accessing the digital data content;
      (c) stops the provision of the digital data content the provision of the digital data content if a predetermined limit on the amount of provided digital data content is exceeded; or a predetermined limit on the amount time the wireless device has been accessing the digital data content is exceeded.

20. The system according to claim 19 wherein the digital data content is provided for a fee except when provided by the system.

* * * * *